April 26, 1932.    F. H. McCORMICK    1,855,887
ELECTRIC HEATER
Filed July 26, 1929

Inventor:
Francis H. McCormick,
by Charles E. Tullar
His Attorney.

Patented Apr. 26, 1932

1,855,887

UNITED STATES PATENT OFFICE

FRANCIS H. McCORMICK, OF GLEN ELLYN, ILLINOIS, ASSIGNOR TO EDISON ELECTRIC APPLIANCE COMPANY, OF CHICAGO, ILLINOIS, A CORPORATION OF NEW YORK

ELECTRIC HEATER

Application filed July 26, 1929. Serial No. 381,311.

My invention relates to electric heaters, more particularly to electric heaters of the type known as "hot plates", and has for its object the provision of an improved electric heater of this character.

More specifically, my invention relates to electric heaters of the hot plate type comprising a top plate, on which an electric heating unit is mounted, the top plate in turn being mounted on a plurality of supporting legs, and has for a further object the provision of a heater of this character having a very neat and clean-cut appearance.

In one of its aspects, my invention contemplates the provision of improved means for detachably assembling the top plate and its supporting legs. My invention also contemplates the provision of improved means for supporting the control switching mechanism, the external connection conductors and auxiliary elements provided for the control of the heating unit.

In carrying my invention into effect in one form thereof, I provide the top plate with a supporting frame-like structure to which the legs are secured. Preferably this supporting structure will be formed with a plurality of band or strip-like members which in the assembled heater will be pressed against a flange depending from the top plate so as to provide a comparatively strong and rigid assembly. To facilitate the assembly and to simplify the construction, I secure the control switch, the external connection conductors, etc., from the frame-like supporting structure.

Figure 1:
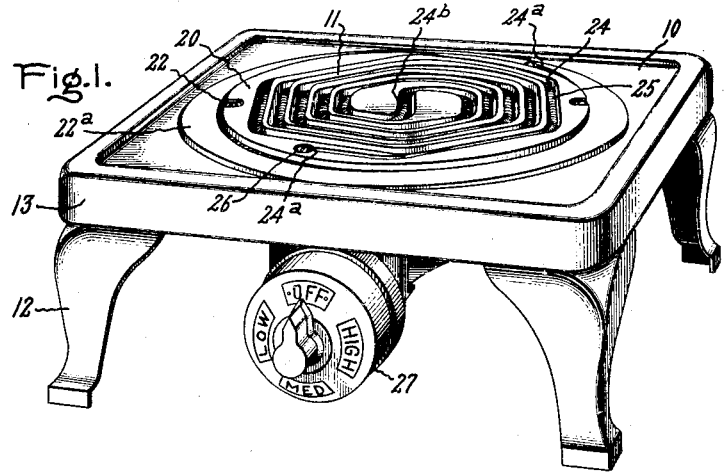
Figure 2:
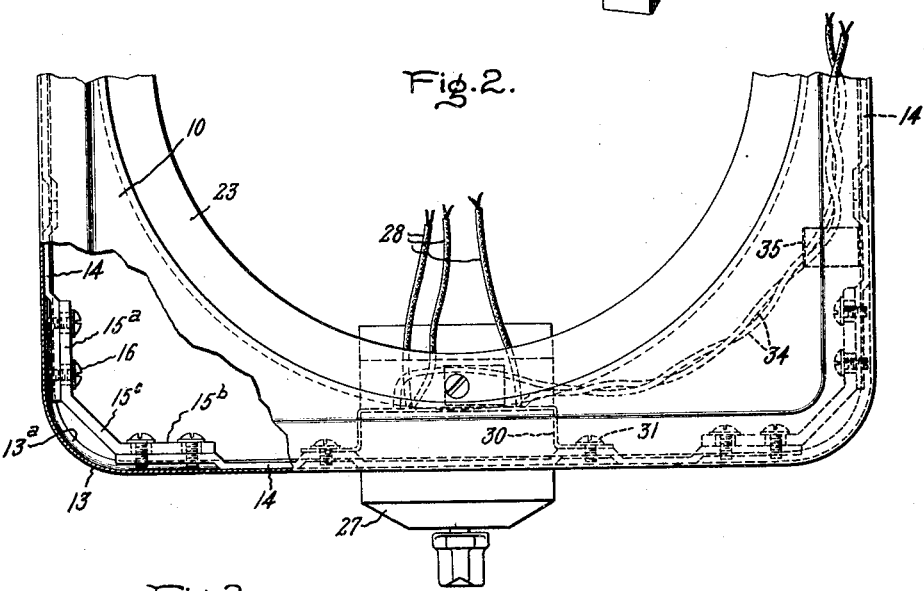
Figure 3:
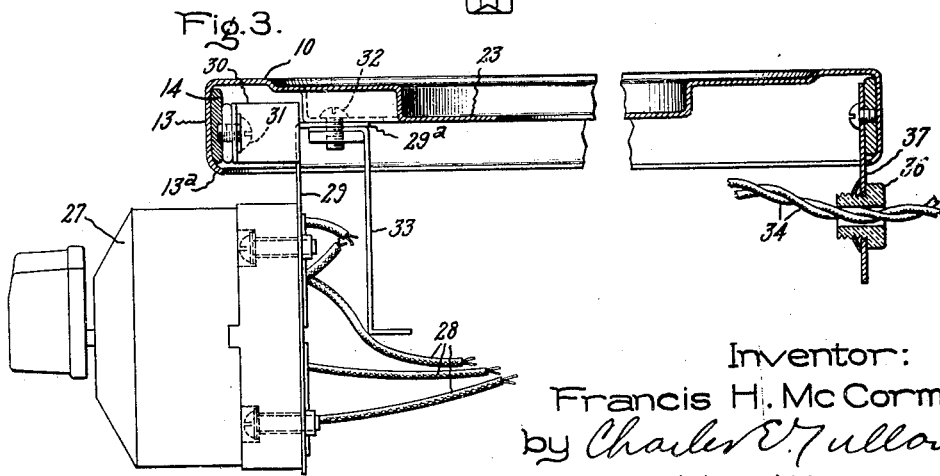

For a more complete understanding of my invention, reference should be had to the accompanying drawings, in which Fig. 1 is a perspective of an electric heater embodying my invention; Fig. 2 is a plan of a portion of the electric heater shown in Fig. 1 with portions broken away to illustrate certain structural details; and Fig. 3 is a vertical section of the electric heater illustrating certain structural details.

Referring to the drawings, I have shown my invention in one form as applied to an electric heater of the hot plate type comprising a top plate 10, on which is mounted an electric heating unit 11, and a plurality of supporting legs 12 for the top plate. The top plate may be any convenient shape and is shown as rectangular. As shown, the top plate is provided with a peripheral downwardly extending flange 13, the lower end of which is inturned so as to form on its lower edge an inturned flange-like portion 13a. Preferably, the top plate, its flange and its supporting legs will be formed from a suitable metallic material such as pressed steel. Moreover, preferably these parts will be covered with a suitable protecting coating such as porcelain enamel.

In order to detachably secure the supporting legs 12 to the top plate 10, I provide a plurality of band or strip-like members 14 which will be assembled with the legs so as to provide a frame-like supporting structure for the top plate. As shown, this frame-like structure is shaped to conform with the peripheral contour of the top plate, i. e., the frame has a rectangular shape. This frame also will be proportioned so that in the assembled heater, the frame will be embraced by the depending flange 13 and will be fitted so that the band-like members 14 will lie between the lower surface of the top plate and the upper surface of the inturned lower edge 13a of the flange. Preferably, the frame will be sprung outwardly against the flange so as to provide a snug fit between the top plate and its supporting structure.

The rectangular frame support comprises four strip or band-like metallic members 14, one being provided for each side of the top plate. As shown, the legs 12 are secured to the members 14 so as to form the rectangular frame support. Each leg 12 is provided at its upper end with an upwardly extending flange 15 comprising two portions 15a and 15b arranged substantially at right angles to each other. These flanges are joined by a middle portion 15c arranged to accommodate the leg to the curved corner portions of the flange. As shown (Fig. 2), the flange portions 15a, 15b are detachably secured, preferably by screw fastening means 16, to the respective adjacent end portions of the strip members 14. Preferably and as shown, the portions of the strip members to which the flange portions are secured are spaced from the inner surface of the depending flange 13 so that the ends of the screws 16 will be accommodated.

It will be observed that these flanges 15 together with the strip-like members 14 comprise a simple and yet sturdy supporting structure for the top plate 10, one which provides for ready assembly of the top plate and its supporting legs.

The heating unit 11 preferably, and as shown, is of the three-heat type, i. e., a unit providing for high, low and medium heats. One form of such a heating unit is described and claimed in the U. S. patent granted to W. A. Rankin, No. 1,522,206 and dated January 6, 1925. Briefly, this heater comprises a disc 20 made of a suitable heat refractory insulating material such as high temperature porcelain. This disc is provided with a suitable metallic retaining casing 22. As shown, this casing is provided with an outwardly projecting flange 22a which is adapted in the assembled heater to rest upon a circular supporting ledge 23 provided on the top plate 10. The disc 11 is provided with a groove 24, shaped in the form of a double spiral, in which the helical element 25 is supported. The groove 24 is polygonal in form, being shown as six sided or hexagonal. At the angles or corners of the hexagon the inner walls of the groove or provided respectively, with overhanging portions and recesses (not shown) by means of which the heating element may be slipped easily in place and held under the projections.

Apertures for the terminals (not shown) are provided in the disc at each end 24a and at the center 24b of the groove, the heating element being secured to suitable headed members 26 provided in these apertures. It will be understood that these headed members 26 are electrically connected by means of suitable leads with three terminals, respectively, and that these terminals in turn are electrically connected with a suitable controlling switch 27 by means of the three leads 28, respectively. The switch 27 is of the three-way type having low, medium and high heat positions so that the two portions of the resistance element may be energized in series relation, or one element alone may be energized or both elements may be energized in parallel relation. Of course, the switch is provided with an "off" position so that the heating unit may be disconnected from its supply source.

In order to facilitate the assembly of the heater and to render the whole more compact and sturdy in construction, I support the switch 27 from the top plate supporting structure. As shown, this switch is suspended from one of the strip-like members 14, preferably from the strip located in the front portion of this heater, by means of a bracket 29 which is secured in turn to the frame structure by means of a second bracket 30. It will be understood that the bracket 29 will be welded or otherwise suitably secured to the bracket 30. As shown, the bracket 30 is secured to the band 14 by means of suitable screw fastening means 31. As before, the portions of the band though which the screw fastening means extend are spaced from the inner surface of the flange 13. In order to enhance the rigidity of the switch supporting structure, I provide the bracket 29 at its upper end with a portion 29a projecting substantially at right angles to the body portion of the bracket. As shown, this portion 29a is secured to the ledge 23 provided on the top plate by means of suitable screw fastening means 32. Preferably, a heat guard 33 will be provided to protect the switch mechanism. As shown, this guard is suspended from the top plate by means of the screw 32.

The external connection conductors 34, which as will be understood will lead from the switch 27 to a suitable plug for connection with an electrical supply source, are secured by means of suitable clips 35, only one of which is shown. These clips are mounted upon the frame-like supporting structure and serve to support the conductors which are led to the rear portion of the heater where they are passed through a suitable bushing 36. As shown, this bushing is supported from the frame structure by means of a suitable bracket 37.

It will be observed from the foregoing description that the frame-like structure serves to support the top plate, the switching mechanism, the external conductor members and the bushing through which these members pass to the exterior of the heater.

It also will be observed that the heater possesses a very neat and clean-cut appearance. The supporting framework is concealed and all screw fastening means and like securing members are hidden.

What I claim as new and desire to secure by Letters Patent of the United States, is:

1. An electric heater comprising a top plate having a peripheral downwardly extended flange, a plurality of legs for supporting said top plate, a framework to which said legs are secured pressed outwardly against the inner surface of said flange and an inwardly projecting member on said flange for securing said framework.

2. An electric heater comprising a top plate having a peripheral flange extending substantially at right angles to the top surface of said plate, an inturned flange-like portion provided on said peripheral flange supporting means for said top plate comprising a framework shaped in conformity with the contour of said flange arranged between the lower surface of said top plate and the upper surface of said inturned flange-like portion and firmly pressed into engagement with one of the vertical surfaces of said flange.

3. An electric heater comprising a top plate having a peripheral downwardly extending flange, said flange being provided with a lower inturned flange-like edge, a plurality of legs for supporting said top plate, and a framework to which said legs are secured mounted between the lower surface of said top plate and the upper surface of said flange-like edge so that said legs are secured to said top plate.

4. An electric heater comprising a top plate having a downwardly extending flange, a supporting member for said top plate embraced by said downwardly extending flange and a plurality of supporting legs attached to said supporting member, said downwardly extending flange being provided with an inturned portion for securing said supporting member.

5. An electric heater comprising a top plate having a peripheral downwardly extending flange, said flange being provided with an inturned portion, a plurality of legs for supporting said top plate and a member to which said legs are secured sprung outwardly against said flange between the lower surface of said top plate and said inturned portion whereby said legs are secured to said top plate.

6. An electric heater comprising a top plate having a downwardly extending flange provided with an inturned portion and a supporting frame-like structure for said top plate embraced by said downwardly extending flange, said frame-like structure comprising a plurality of supporting legs and a plurality of members secured to said legs so that said supporting structure assumes a shape substantially in conformity with the peripheral contour of said downwardly extending flange and is secured between the lower surface of said top plate and the inturned portion of said flange.

7. An electric heater comprising a top plate having a peripheral downwardly extending flange, said flange having an inturned lower edge, a plurality of supporting legs for said top plate and a plurality of metallic strip-like members to which said legs are detachably secured so as to form a supporting framework for said top plate, said framework being secured between the lower surface of said top plate and the upper surface of the lower inturned edge of said flange.

8. An electric heater comprising a top plate having a peripheral downwardly extending flange, a plurality of legs for supporting said top plate and means for detachably securing said legs to said top plate comprising a plurality of strip-like members and screw fastening means for connecting said legs to said strip-like members so as to form a framework which is pressed against the inner surface of said downwardly extending flange, the portions of said strip-like members which receive said screw fastening means being spaced from said inner surface.

9. An electric heater comprising a top plate having a peripheral downwardly extending flange, a resistance heating element mounted on said top plate, a control switch for said heating element, a plurality of supporting legs for said top plate and means embraced by said downwardly extending flange for supporting said control switch and securing said legs.

10. An electric heater comprising a top plate having a peripheral downwardly extending flange, a resistance heating element mounted upon said top plate, a switch for controlling the energization of said heating element, a plurality of legs for supporting said top plate and a framework for supporting said switch and securing said legs embraced by said downwardly extending flange.

11. An electric heater comprising a top plate having a peripheral downwardly extending flange, said flange having an inturned lower edge, a heating unit comprising a resistance heating element mounted on said top plate, a plurality of supporting legs for said top plate, a plurality of strip-like members detachably secured with said legs so as to form a supporting framework for said top plate, said supporting framework being embraced by said downwardly extending flange and being secured between the lower surface of said top plate and the upper surface of said inturned edge, a switch for said resistance element suspended on said supporting framework and a bushing secured to said framework for receiving external connection conductors for said resistance element.

In witness whereof, I have hereto set my hand this 23rd day of July, 1929.

FRANCIS H. McCORMICK.